United States Patent Office 3,290,315
Patented Dec. 6, 1966

3,290,315
ESTERS OF 6,7-DI(LOWER)ALKOXY-4-HYDROXY-3-QUINOLINECARBOXYLIC ACID
Edward John Watson, Jr., New Orleans, La., assignor to The Norwich Pharmacal Company, a corporation of New York
No Drawing. Filed Mar. 17, 1965, Ser. No. 440,621
6 Claims. (Cl. 260—287)

This application is a continuation-in-part of my copending application Serial No. 380,058, filed July 2, 1964; which, in turn, is a continuation-in-part of my application Serial No. 272,858, filed April 11, 1963, now abandoned; which, in turn, is a continuation-in-part of my application Serial No. 242,933, filed December 7, 1962, and which, in turn, is a continuation-in-part of my application Serial No. 185,806, filed April 9, 1962, now abandoned.

This invention relates to new chemical compounds, esters of 6,7-di(lower)alkoxy-4-hydroxy-3-quinolinecarboxylic acid, represented by the formula:

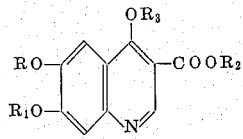

wherein R and $R_1$ each represent a member of the group consisting of lower alkyl and lower alkenyl containing from two to four carbon atoms; $R_2$ represents a member of the group consisting of lower alkyl and allyl; and $R_3$ represents a member of the group consisting of hydrogen and acetyl.

These new compounds are distinguished by the high order of chemotherapeutic activity which they exhibit in the treatment of parasitic infections in animals when administered in far less than toxic amounts. They have proved surprisingly successful upon oral administration in combatting coccidiosis.

Coccidiosis, a prevalent and economically significant disease of poultry, is caused by a variety of coccidia including *Eimeria tenella*, *Eimeria acervulina* and *Eimeria necatrix*. The new compounds of this invention are highly effective agents against such coccidia. When incorporated in a nutritionally balanced diet at a level of from about 0.003 to about 0.1% by weight and offered to coccidially infected chickens, they overcome the mortality and morbidity usually associated with coccidial disease and accomplish a salutary effect upon growth and appearance of the birds.

The preparation of these new compounds in a form permitting convenient administration is readily accomplished by admixing them in the diet of animals as indicated hereinabove. Since the diet is a very effective and convenient means for administering medication for prophylactic or therapeutic effect, many combinations of suitable ingredients will occur to those skilled in the art as carriers for the anticoccidial compounds of this invention. Thus, commonly used ingredients comprise ground oyster shells, Attapulgus clay, commercial poultry feeds, urea, corn meal, ground citrus meal, fermentation residues, distiller's grains, soybean oil, lecithin and the like.

As a matter of facility it is customary to supply a premix or concentrate containing from about 5–50% of active ingredient and adapted to be extended with other suitable carriers to the end use application which usually comprehends from about 0.006 to about 0.1% of active ingredient. Such premix is readily and commonly prepared by admixing the active ingredient in the selected carrier by tumbling, grinding or stirring. A representative premix comprises:

| | Percent | Per Pound |
|---|---|---|
| Active ingredient | 22.05 | 100.00 |
| Lecithin | 2.00 | 9.07 |
| Soybean oil | 2.00 | 9.07 |
| Corn meal | 73.95 | 335.45 |

This may be extended by dilution through addition of combinations of the aforementioned ingredients to prepare the requisite diet for administration to the infected or potentially infected host. They may, if desired, be incorporated in tablets, gelatin capsules, suspensions or like compositions consisting of suitable carriers and adjuvants common to the pharmaceutical art.

The method which is currently preferred for the preparation of the new compounds of this invention consists in reducing a 1,2-dialkoxy-4-nitrobenzene in the presence of a catalyst such as palladium-on-carbon and a solvent such as ethanol; addition of the appropriate dialkylalkoxymethylene malonic ester; for instance, diethylethoxymethylene or dimethylmethoxymethylene malonate, to the solution of the reduced product; removal of the solvent; and addition of a temperature-regulating medium such as Dowtherm® followed by application of heat to the mixture. Alternatively, instead of Dowtherm®, cyclization may be effected through the use of a phosphorus oxyhalide such as phosphorus oxychloride followed by heating in the presence of an acid medium.

Other esters may be prepared by the saponification of one of them followed by subjecting the acid formed to the Fisher-Speier of Schotten-Baumann reaction. Still another method for preparing various esters consists in the transesterification technique whereby one alcohol moiety is exchanged for another.

The preparation of compounds wherein $R_3$ is an acyl group is readily carried out by treating the corresponding quinolinol with an acylating agent such as acetic anhydride.

In order that this invention may be fully available to and understood by those skilled in the art, the following examples for preparing the compounds thereof are described briefly.

*Example 1.—Ethyl 6,7-diethoxy-4-hydroxy-3-quinolinecarboxylate*

1,2-diethoxy-4-nitrobenzene (30 g., 0.142 mole) is placed in a heavy-walled bottle with 3 g. of 5% Pd-on-carbon and 130 ml. of ethanol. In 1 hour 38.5 p.s.i.g. of hydrogen is absorbed (theory 36.2). The catalyst is filtered off and washed with a small amount of ethanol.

In a 1 liter, 3-necked flask is placed the above alcoholic solution and 30 g. (0.142 mole) of diethylethoxymethylene malonate is added. Nitrogen is bubbled through the mixture, which is heated on the steam bath to distill off ethanol. After this, 300 ml. of "Dowtherm A" is added and the temperature rapidly raised to 250° C. by heating with a mantle. The mixture is allowed to reflux for 30–40 minutes and the solution is then allowed to cool. The crystals that form are filtered and washed with hexane. There are obtained 18.6 g. (61% yield); M.P. 275–280° C.; of ethyl 6, 7 - diethoxy - 4 - hydroxy - 3 - quinolinecarboxylate.

Calc. for $C_{16}H_{19}NO_5$: C, 62.94; H, 6.27; N, 4.59. Found: C, 62.68; H, 6.25; N, 4.94.

Example II.—Ethyl 6,7-dibutoxy-4-hydroxy-3-quinolinecarboxylate

In a heavy-walled bottle is placed 29.48 g. (0.11 mole) of 1,2-dibutoxy-4-nitrobenzene, 200 ml. of ethanol and 3 g. of Pd-on-carbon. Theoretical uptake of hydrogen upon reduction of this mixture in a Parr apparatus is achieved in one hour (30 p.s.i.g.). The reduction is repeated with an equal amount of the nitro compound. The reduced material is combined, filtered and the catalyst washed with ethanol. The filtrate is placed in a 1 liter, 3-necked flask together with 47.5 g. of diethylethoxymethylene malonate. The mixture is heated on a steam bath and ethanol removed by distillation. "Dowtherm A" (600 ml.) is added and the mixture is rapidly heated to reflux (250° C.). After refluxing for 40 minutes, the mixture is cooled to room temperature. Hexane is added. The crystalline precipitate is filtered and washed with hexane. A 29% yield of crude ethyl 6,7-dibutoxy-4-hydroxy-3-quinolinecarboxylate is obtained (22.76 g.) (M.P. 260–285° C.).

This may be recrystallized from dimethylformamide using charcoal, if desired, to yield 19% of ethyl 6,7-dibutoxy-4-hydroxy-3-quinolinecarboxylate having a melting point of 279–284° C.

Calc. for $C_{20}H_{27}NO_5$: C, 66.46; H, 7.53; N, 3.87. Found: C, 66.36; H, 7.42; N, 3.70.

Example III.—Ethyl 6,7-dipropoxy-4-hydroxy-3-quinolinecarboxylate

In a heavy-walled bottle is placed 38 g. (0.16 mole) of 1,2-dipropoxy-4-nitrobenzene, 200 ml. of ethanol and 3 g. of 5% Pd-on-carbon. The mixture is hydrogenated in a Parr apparatus to give a hydrogen uptake of 41 p.s.i.g. (theory 42 p.s.i.g.). This is repeated until a total of 172 g. (0.72 mole) of nitro compound has been reduced. The catalyst is filtered off and the ethanolic filtrates are combined for the next step.

The ethanolic solution is mixed with diethylethoxymethylene malonate (0.72 mole) and the alcohol is removed by distillation on a steam bath. Heating is continued for three hours. "Dowtherm A" (750 ml.) is added and the mixture is heated rapidly to reflux. The solution is refluxed for 30 minutes and allowed to cool. The crystalline precipitate is filtered and washed with hexane. The yield of title compound is 96 g. (40% yield from the nitro compound). It may be recrystallized from dimethylformamide (M.P. 271–273° C.).

Calc. for $C_{18}H_{23}NO_5$: C, 64.85; H, 6.95; N, 4.20. Found: C, 64.70; H, 6.80; N, 4.43.

Example IV.—Methyl 6,7-diethoxy-4-hydroxyquinoline-3-carboxylate (A) In a 1 l. flask is placed the ester of Example I, 73 g. (0.24 mole), and 300 ml. of 10% sodium hydroxide solution. The mixture is refluxed for 2½ hours. Charcoal is added and the mixture is filtered hot. It is then allowed to cool. The mixture is acidified with about 200 ml. of 1:1 hydrochloric acid (100 ml. conc. hydrochloric acid and 100 ml. of water). A cream-colored precipitate forms. This is filtered, washed with water and allowed to dry overnight at 110° C. In this way, 6,7-diethoxy-4-hydroxyquinoline-3-carboxylic acid is obtained, M.P. 265–273° C. This may be recrystallized from dimethylformamide to give a melting point of 266–269° C. To 56 g. (0.2 mole) of the acid suspended in 1500 ml. of benzene is added 15 ml. (0.2 mole) of thionyl chloride with stirring. The mixture is heated at reflux with stirring for 8½ hours until no more HCl gas is evolved. After slight cooling, the solid is collected and washed well with benzene and then ether, yielding 56 g. (94.7%) of acid chloride, M.P. 260° C.

A suspension of 54.5 g. (0.185 mole) of the acid chloride in 1500 ml. of methanol is heated at reflux on the steam bath for 5½ hours. The reaction mixture is filtered hot and the filtrate cooled. The solid which separates is filtered and washed with ether; weight 13 g. On adding water to the original filtrate more solid is obtained which is collected and dried. A total of about 50 g. (93% of crude product is obtained. Recrystallization from 3 l. of dimethylformamide and charcoal gives 35.0 g. of methyl 6,7-diethoxy-4-hydroxy-3-quinolinecarboxylate melting at 276.5–278.5° C.

Calc. for $C_{15}H_{17}NO_5$: C, 61.80; H, 5.83; N, 4.81. Found: C, 61.64; H, 5.93; N, 4.95.

(B) 6.1 g. (0.02 mole) of the compound of Example I in 700 ml. of methanol and a small amount of p-toluene sulfonic acid is heated to reflux for 7 days. The reaction mixture is filtered hot and the solid is washed with ether and dried to give 2.3 g. of title compound, M.P. 275–278° C. By concentrating the original reaction mixture an additional 2.2 g. solid may be obtained. Total amount of title compound obtained is 4.5 g. (77.6%).

Example V.—Ethyl 6,7-diisopropoxy-4-hydroxy-3-quinolinecarboxylate

A. *o-Diisopropoxybenzene.*—A slow stream of nitrogen is passed through a solution of 220 g. (2 moles) of catechol in 900 ml. of alcohol in a 3-l. 3-necked flask equipped with stirrer, reflux condenser, dropping funnel and nitrogen inlet. After a few minutes stirring, 160 g. (4 moles) of sodium hydroxide is added and stirring is continued until practically all of the sodium hydroxide has dissolved. To the stirred, thick suspension is added 750 g. (6 moles) of 2-bromopropane over a 2-hour period, maintaining gentle refluxing by means of a steam bath. After the addition, the nitrogen is turned off and refluxing is continued for 18 hours. The mixture is cooled thoroughly and the sodium bromide is filtered and washed with alcohol. The combined filtrate and washings are concentrated in vacuo until as much alcohol as possible has been removed. A further amount of sodium bromide which separates during the concentration is removed; a total of 390 g. of sodium bromide (95% of calcd.) was obtained.

The oily residue is dissolved in 500 ml. of ether and extracted with four 200 ml. portions of 10% sodium hydroxide solution, then with two 100 ml. portions of water.

The ether solution is dried over magnesium sulfate and concentrated, first at atmospheric pressure and then in vacuo, to an amber-colored oil weighing 182 g. (47% of theory for diisopropoxybenzene).

B. *1,2 - diisopropoxy - 4 - nitrobenzene.*—o-Diisopropoxybenzene (140 g., 0.72 mole) is added dropwise to a stirred solution of 90 ml. of concentrated nitric acid in 90 ml. of water over a period of one hour. The temperature is maintained at 20–25° C. by intermittent application of an ice bath. Stirring is continued until all exothermic reaction has ceased. The reaction mixture is diluted with an equal volume of ice water and the dark, oily product extracted with three 250 ml. portions of chloroform. The combined chloroform extracts are washed with three 100 ml. portions of water and dried over magnesium sulfate. An equal volume of carbon tetrachloride is added and this solution is poured onto a 60 x 600 mm. column of alumina (Merck 71707; ca. 3.5 lbs.). The column is eluted with a mixture of equal parts of chloroform and carbon tetrachloride at a flow rate of 30 ml./min. After collection of ca. 3 l. of yellow solution, the eluate became almost colorless, a dark brown zone remaining at the top. Concentration of the yellow eluate in vacuo gives 100 g. (58%) of the titled nitro compound as a yellow oil.

C. *Ethyl 6,7 - diisopropoxy-4-hydroxy-3-quinolinecarboxylate.*—A 20 g. portion (0.084 mole) of 1,2-diisopropoxy-4-nitrobenzene is hydrogenated over 2 g. of 10% palladium-charcoal catalyst in 200 ml. of alcohol at 40 p.s.i. initial pressure. The reduction ceases after a pressure drop of 23 lbs. (87% of calcd.) in 30 min. The catalyst is filtered, 18 g. (0.084 mole) of diethylethoxymethylene malonate is added and the solution is heated under reflux for 2 hours. The amber-colored, oily residue remaining after distillation of the alcohol in vacuo is added to 900 ml. of "Dowtherm A" at ca. 245° C. This solution is boiled for 30 minutes, then allowed to cool overnight. The crude product is filtered, washed with "Dowtherm," then with benzene and dried at 80° C.; 9.7 g. (35%) of the title compound is obtained as light tan crystals, M.P. 220–228° C. Recrystallization from dimethylformamide gives 6.4 g. of white crystals, M.P. 233–234° C.

Calc. for $C_{18}H_{23}NO_5$: C, 64.85; H, 6.95; N, 4.20. Found: C, 64.53; H, 6.94; N, 4.37.

*Example VI.—Methyl 6,7-diisopropoxy-4-hydroxy-3-quinolinecarboxylate*

A 25 g. sample (0.11 mole) of 1,2-diisopropoxy-4-nitrobenzene (Example V, B.) is hydrogenated over 4 g. of 5% palladium-charcoal catalyst containing 50% water in 200 ml. of alcohol at 40 p.s.i. initial pressure. The reaction ceases after a pressure drop of 23 lbs. (87% of calcd.) in 30 min. The catalyst is filtered and to the combined filtrates from two such reductions is added 38 g. (0.22 mole) of dimethylmethoxymethylene malonate in 200 ml. of alcohol. This solution is heated under reflux for 1¼ hours and then concentrated in vacuo to a viscous residue.

This residue is heated on a steam bath and added to 1400 ml. of "Dowtherm A" preheated to 245° C. The solution is boiled for 20 minutes; then allowed to cool. The crude product is filtered, washed with "Dowtherm," then with acetone and air dried; 25 g. (40%) of the title compound is obtained, M.P. 244–252° C.

Recrystallization of 52 g. of this product from 550 ml. of dimethylformamide gives 43 g. of white crystals, M.P. 253–256° C.

Calc. for $C_{17}H_{21}NO_5$: C, 63.93; H, 6.63; N, 4.39. Found: C, 64.03; H, 6.52; N, 4.53.

*Example VII.—Ethyl 6,7-diisobutoxy-4-hydroxy-3-quinolinecarboxylate*

To a solution of 197 g. (1.8 M) of catechol in 730 ml. of ethanol is added 143 g. (3.6 M) of sodium hydroxide pellets in a nitrogen atmosphere. When salt formation is complete, 490 g. (3.6 M) of isobutyl bromide is added dropwise at 55–65°. The nitrogen inlet tube is removed, and this mixture is refluxed for 17 hours. The sodium bromide is removed by filtration and the filtrate concentrated. The tar-like residue is taken up in 2 l. of water and extracted with 2 l. and then 1 l. of ether. These ether extracts are combined and washed with 2×500 ml. of a 10% sodium hydroxide solution and then with 2×1 l. of $H_2O$. After drying the ether solution over $MgSO_4$ it is concentrated to a residue weighing 125 g. (33%).

While maintaining the temperature below 25° with an ice bath, 105 g. (.47 M) of 1,2-diisobutoxybenzene is added dropwise to a 1:1 solution of water and concentrated nitric acid. On completion of the addition, cooling is continued until the reaction is no longer exothermic. The mixture is poured into 2 l. of ice water with stirring. The resulting brown solid is filtered, washed well with water until washings are no longer acid, dissolved in slightly warm methanol and filtered. A little water is added to induce crystallization. The recrystallized material weighs 49 g. (39%), M.P. 68–72° C.

To 2 g. of 5% Pd/O containing 50% water is added 16 g. (.06 M) of 3,4-diisobutoxynitrobenzene and 200 ml. of ethanol. On shaking in a hydrogen atmosphere for 20 minutes the theoretical amount of hydrogen is consumed. The catalyst is removed by filtration, and the filtrate is added to 13 g. (.06 M) of diethylethoxymethylene malonate and refluxed in a nitrogen atmosphere for 1 hour. White crystals of the anil separate upon cooling to room temperature, 18 g. (74%), M.P. 77–79° C.

A 56 g. sample of the anil prepared in this way is added to 600 ml. of "Dowtherm" and the solution refluxed for 1 hour. The solid product is washed with hexane, giving 31 g. (81%), M.P. 282–284° C. Two recrystallizations from dimethylformamide yield 25 g. of title product M.P. 288–291° C.

Calc. for $C_{20}H_{27}NO_5$: C, 66.46; H, 7.53; N, 3.87. Found: C, 66.53; H, 7.24; N, 4.13.

*Example VIII.—Isopropyl 4-hydroxy-6,7-diisopropoxy-3-quinolinecarboxylate*

A mixture of 64 g. (0.2 M) of the compound of Example VI and 20 g. of p-toluene-sulfonic acid in 1600 ml. of isopropanol is heated to reflux for 70 hours. The solution is filtered and the filtrate cooled. A small amount of solid separates and is discarded. The filtrate is concentrated on the steam bath at reduced pressure. The solid residue is collected and washed with ether and dried. It is then triturated with $Na_2CO_3$ solution and collected and washed well with $H_2O$. Recrystallization from about 800 ml. isopropanol gives 26.7 g. of title product (38.5%) M.P. 225–228° C.

Calc. for $C_{19}H_{25}NO_5$: C, 65.69; H, 7.25; N, 4.03. Found: C, 65.30; H, 7.40; N, 3.90.

*Example IX.—Ethyl 4-acetoxy-6,7-diethoxy-3-quinolinecarboxylate*

A mixture of 50 g. (0.16 mole) of the compound of Example I and 30 g. of anhydrous sodium acetate in 1250 ml. of acetic anhydride is heated to reflux for 2¼ hours and then allowed to cool. The solid is collected and washed with cold water and dried. The yield is 49 g. (86%) of title product, M.P. 169–172° C. It may be recrystallized from ethanol.

Calc. for $C_{18}H_{21}NO_6$: C, 62.23; H, 6.09; N, 4.23. Found: C, 62.19; H, 6.08; N, 3.89.

*Example X.—Methyl 4-acetoxy-6,7-diisopropoxy-3-quinolinecarboxylate*

A mixture of 2 g. of the compound of Example VI and 2 g. of anhydrous sodium acetate in 50 ml. acetic anhydride is heated to reflux for 2½ hours. The mixture is then poured onto cracked ice. Oily material gradually solidifies and is collected and washed well with $H_2O$ and dried to yield 1.8 g. of title product (79.5%), M.P. 102–104° C.

Calc. for $C_{19}H_{23}NO_6$: C, 63.14; H, 6.42; N, 3.88. Found: C, 63.03; H, 6.44; N, 4.00.

*Example XI.—Allyl 6,7-diethoxy-4-hydroxy-3-quinolinecarboxylate*

To 1500 ml. of allyl alcohol at room temperature is added 50 g. of 6,7-diethoxy-4-hydroxy-3-quinolinecarbonyl chloride. After 2 days standing at room temperature, the slightly cloudy solution is filtered. Ether is added to the filtrate to the cloud point. After cooling, white solid separates gradually. The solid is collected, washed well with ether, triturated with $H_2O$ and dried to yield 38 g. (71%), of title product, M.P. 250–253° C. with previous softening. It may be recrystallized from dimethylformamide.

Calc. for $C_{17}H_{19}NO_5$: C, 64.34; H, 6.04; N, 4.41. Found: C, 64.10; H, 6.12; N, 4.48.

*Example XII.—Allyl 6,7-diisobutoxy-4-hydroxy-3-quinolinecarboxylate*

A. A mixture of 37.5 g. (0.104 M) of the compound of Example VII in 200 ml. of 10% NaOH is heated to reflux for 3¾ hours. Upon slight cooling, jellylike material separates which is dissolved by the addition of more base and large amount of $H_2O$ with heating. The solution is filtered hot and the cloudy hot filtrate is acidified with conc. HCl. After cooling, the solid is collected and washed well with $H_2O$. The yield is 30.5 g. (85%), of 6,7 - diisobutoxy- - 4 - hydroxy - 3 - quinolinecarboxylic acid hydrate, M.P. 243–250° C. It may be purified by dissolving in NaOH solution, filtering, acidifying, filtering again and recrystallizing from dimethylformamide, M.P. 256–257° C.

B. A suspension of 19 g. (0.057 M) of the acid of A. in 600 ml. benzene in a 1 l. 3-necked flask fitted with a stirrer and a Dean-Stark trap is refluxed for an hour. A small amount of H$_2$O is separated. Then 4.5 ml. (10% excess) of SOCl$_2$ is added and the reaction mixture is refluxed with stirring for 9½ hours and cooled overnight. Solid is collected, washed with benzene then ether and dried in 100° C. oven for 10 minutes. The yield is 18 g. (90%) of acid chloride, M.P. 252–255° C.

C. A mixture of 6.0 g. (0.017 M) of 6,7-diisobutoxy-4-hydroxy-3-quinolinecarbonyl chloride in 300 ml. allyl alcohol is heated on a steam bath for about 10 minutes. The solution is neutralized to pH 7–8 with conc. NH$_4$OH and solid separates. Ether is added and the reaction mixture cooled. Solid is collected, washed well with ether and triturated well with H$_2$O, filtered and dried in 100° C. oven. The yield of title product is 4.6 g. (72.5%), M.P. 235–236° C.

Calc. for C$_{21}$H$_{27}$NO$_5$: C, 67.54; H, 7.29; N, 3.75. Found: C, 67.74; H, 7.24; N, 3.95.

*Example XIII.—Ethyl 4-hydroxy-6,7-bis-(2-methylallyloxy)-3-quinolinecarboxylate*

A. *o-Bis (2-methylallyloxy) benzene.*—To a solution of 110 g. of catechol in 4 l. of dimethylformamide is added 110 g. of NaOCH$_3$ powder in about 10 minutes with stirring. The reaction mixture is stirred for ½ hour with slight warming. Then heating is stopped and 182 g. of methallyl chloride is added in about 5 minutes at 37° C. The temperature gradually rises to 46° C. in about ½ hour. The reaction mixture is allowed to stir overnight and then heated to 45–50° C. for an additional hour. The reaction mixture is cooled and filtered. The filtrate is acidified to pH 6, poured into H$_2$O and extracted with 16×20 ml. of benzene. The benzene extract is washed with 10% NaOH solution followed by H$_2$O until the washings are neutral. After drying over MgSO$_4$ and distilling, 156 g. (72%) of A. is obtained, distilling at 91° C/0.35 mm.

B. *3,4-Bis-(2-methylallyloxy) nitrobenzene.*—Eleven grams of 1,2-bis-(2-methylallyloxy)benzene is added to 25 ml. of concentrated nitric acid over a 30-minute period at 10–20° C. with stirring. After stirring an additional 30 minutes, the solid mass is broken up and poured into 300 ml. of ice water. The solid is filtered, suspended in fresh water, filtered again, washed well with water, then with a little cold methanol and air dried; 11 g. (82%) of 3,4-bis-(2-methallyloxy)nitrobenzene is obtained; M.P. 78–81° C.

C. *3,4-bis-(2-methylallyloxy)aminobenzene.*—To a mixture of 92 g. of 3,4-bis-(2-methylallyloxy)nitrobenzene in 2100 ml. of ethanol and 550 ml. of H$_2$O is added a solution of 27 g. CaCl$_2$ in 100 ml. of H$_2$O together with 500 g. of Zn dust. The mixture is heated to reflux with stirring for 4 hours, filtered while still warm, and the Zn dust is washed with ethanol. The filtrate is concentrated in vacuo to a dark syrupy residue. Water and some conc. HCl is added to this residue and solid separates upon standing. The solid is triturated with about 6 l. of H$_2$O and filtered. The filtrate is made alkaline to pH 8–0 with conc. NH$_4$OH and then extracted with ether. After drying over MgSO$_4$, ether is distilled off to give 57 g. (70%) of C.

D. *Ethyl 4-chloro-6,7-bis(2-methylallyloxy)-3-quinolinecarboxylate.*—The amine of C. is heated to reflux with 52.8 g. (0.24 M) of diethylethoxymethylenemalonate in 150 ml. of ethanol for 2 hours. The solution is concentrated in vacuo to give a viscous liquid which solidifies upon cooling. The yield of anil is 98 g. (99.5%). A mixture of 97 g. of the anil and 400 ml. of POCl$_3$ is heated on a steam bath for 2 hours. The excess POCl$_3$ is then distilled off in vacuo and the residue poured onto cracked ice. The cold mixture is made slightly basic with conc. NH$_4$OH and solid separates. The solid is collected, washed well with H$_2$O and air dried to give 87 g. (96.5%) of D., gradually melting to a red liquid above 85° C.

E. *Ethyl 4-hydroxy-6,7-bis(2-methylallyloxy)-3-quinolinecarboxylate.*—A mixture of 87 g. of ethyl 4-chloro-6,7-bis(2-methylaliyloxy)-3-quinolinecarboxylate and 30 g. of anhydrous sodium acetate in 1 l. of acetic acid is heated to boiling for 45 minutes. After cooling, the solid is collected, washed well with ether and dried to give 44 g. of E. It may be recrystallized from dimethylformamide with decomposition, M.P. 226° to 228° C.

Calc. for C$_{20}$H$_{23}$NO$_5$: C, 67.21; H, 6.49; N, 3.92. Found: C, 67.02; H, 6.38; N, 4.06.

What is claimed is:
1. A compound of the formula:

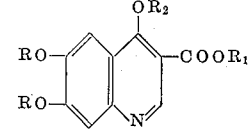

wherein:
R is a member of the group consisting of ethyl isopropyl, isobutyl and methallyl;
R$_1$ is a member of the group consisting of methyl, ethyl and allyl;
R$_2$ is a member of the group consisting of hydrogen and acetyl; and when R$_2$ is hydrogen at least one of R and R$_1$ is the aforesaid alkenyl radical.

2. Allyl 6,7-diisobutoxy-4-hydroxy-3-quinolinecarboxylate.

3. Ethyl 6,7-bis(2-methylallyloxy)-4-hydroxy-3-quinolinecarboxylate.

4. Ethyl 4-acetoxy-6,7-diethoxy-3-quinolinecarboxylate.

5. Methyl 4-acetoxy-6,7-diisopropoxy-3-quinolinecarboxylate.

6. Allyl 6,7-diethoxy-4-hydroxy-3-quinolinecarboxylate.

References Cited by the Examiner

Riegel et al.: J. Am. Chem. Soc., vol. 68, pp. 1264–6 (1946).

ALEX MAZEL, *Primary Examiner.*

H. R. JILES, *Examiner.*

D. G. DAUSS, *Assistant Examiner.*